US008058588B2

(12) United States Patent
Gagas et al.

(10) Patent No.: US 8,058,588 B2
(45) Date of Patent: Nov. 15, 2011

(54) ELECTRONICALLY CONTROLLED WARMER DRAWER

(75) Inventors: John M. Gagas, Milwaukee, WI (US); Richard C. Hochschild, Jr., Grafton, WI (US); Scott A. Jonovic, Cottage Grove, WI (US)

(73) Assignee: Western Industries, Inc., Menomonee Falls, WI (US)

( * ) Notice: Subject to any disclaimer, the term of this patent is extended or adjusted under 35 U.S.C. 154(b) by 493 days.

(21) Appl. No.: 12/017,895

(22) Filed: Jan. 22, 2008

(65) Prior Publication Data
US 2008/0173631 A1    Jul. 24, 2008

Related U.S. Application Data

(63) Continuation-in-part of application No. 11/216,443, filed on Aug. 31, 2005, now Pat. No. 7,488,919.

(60) Provisional application No. 60/886,037, filed on Jan. 22, 2007.

(51) Int. Cl.
F26B 9/06    (2006.01)

(52) U.S. Cl. ............... 219/400; 34/132; 34/197; 34/218

(58) Field of Classification Search .......................... None
See application file for complete search history.

(56) References Cited

U.S. PATENT DOCUMENTS

| | | | |
|---|---|---|---|
| 2,957,067 A | 10/1960 | Scofield | |
| 3,485,229 A * | 12/1969 | Gilliom | 126/21 A |
| 3,861,378 A * | 1/1975 | Rhoads et al. | 126/21 A |
| 3,958,552 A | 5/1976 | Lawler | |
| 3,978,238 A | 8/1976 | Frey et al. | |
| 4,039,776 A | 8/1977 | Roderick | |
| 4,298,789 A | 11/1981 | Eichelberger et al. | |
| 4,345,143 A | 8/1982 | Craig et al. | |
| 4,439,459 A | 3/1984 | Swartley | |
| 4,444,175 A | 4/1984 | Reynolds | |
| 4,468,424 A | 8/1984 | Cartwright | |
| 4,503,760 A | 3/1985 | Pryputsch et al. | |
| 4,622,231 A | 11/1986 | Swartley | |
| 4,682,424 A * | 7/1987 | Irving | 34/621 |
| 4,751,368 A | 6/1988 | Daifotes | |
| 4,751,911 A | 6/1988 | Betts et al. | |
| 4,980,539 A | 12/1990 | Walton | |
| 5,086,752 A | 2/1992 | Hait | |
| 5,152,077 A * | 10/1992 | Liang | 34/77 |
| 5,204,503 A * | 4/1993 | Maiellano et al. | 219/681 |

(Continued)

OTHER PUBLICATIONS

"Wolf Warming Use and Care Information," Instruction Manual, Jan. 2004.

(Continued)

Primary Examiner — Joseph M Pelham
(74) Attorney, Agent, or Firm — Boyle Fredrickson, S.C.

(57) ABSTRACT

An electronically controlled warmer drawer that supports a plurality of products, e.g., towels, in a drawer that is attached to a housing is disclosed. The housing includes a plurality of flow paths constructed to facilitate the passage of a heated gas flow through the cavity defined by the drawer. The drawer further includes a plurality of brackets constructed to support the articles to be heated along with a user interface, vents, blower fan, electrical heating element and two internal chambers. The system is controlled by way of the user interface on the front of the housing that interacts with an electronic control system to operate the heating element and fan. A sensor sends signals to the electronic control system to regulate the heating element and fan.

19 Claims, 10 Drawing Sheets

U.S. PATENT DOCUMENTS

| | | | |
|---|---|---|---|
| 5,228,385 A * | 7/1993 | Friedrich et al. | 99/352 |
| 5,233,969 A | 8/1993 | Koledin | |
| 5,365,039 A | 11/1994 | Chaufoir | |
| 5,417,148 A | 5/1995 | Cavallo | |
| 5,466,058 A | 11/1995 | Chan | |
| 5,548,100 A | 8/1996 | Miller | |
| 5,555,640 A * | 9/1996 | Ou | 34/202 |
| 5,569,403 A | 10/1996 | Swanson et al. | |
| 5,599,471 A * | 2/1997 | Zaidman | 219/400 |
| 5,606,640 A | 2/1997 | Murphy | |
| 5,619,613 A | 4/1997 | Otaki | |
| 5,642,462 A * | 6/1997 | Huff | 392/382 |
| 5,676,051 A | 10/1997 | Sinemus | |
| 5,783,803 A | 7/1998 | Robards, Jr. | |
| 5,842,287 A | 12/1998 | Murphy | |
| 5,873,300 A | 2/1999 | Kuhlman | |
| 5,900,173 A | 5/1999 | Robards, Jr. | |
| 5,948,301 A | 9/1999 | Liebermann | |
| 5,961,866 A | 10/1999 | Hansen | |
| 6,005,227 A | 12/1999 | Pappas | |
| 6,018,885 A * | 2/2000 | Hill | 34/202 |
| 6,041,773 A | 3/2000 | Rosenquist | |
| 6,046,436 A | 4/2000 | Hunts | |
| 6,108,486 A | 8/2000 | Sawabe et al. | |
| 6,108,489 A | 8/2000 | Frohlich et al. | |
| 6,111,224 A | 8/2000 | Witt | |
| 6,116,154 A | 9/2000 | Vaseloff | |
| 6,121,583 A | 9/2000 | Hansen | |
| 6,124,572 A | 9/2000 | Spilger et al. | |
| 6,166,353 A | 12/2000 | Senneville et al. | |
| 6,191,391 B1 | 2/2001 | Deo et al. | |
| 6,259,067 B1 | 7/2001 | Faries, Jr. et al. | |
| 6,265,695 B1 | 7/2001 | Liebermann | |
| 6,294,762 B1 | 9/2001 | Faries, Jr. et al. | |
| 6,376,805 B2 | 4/2002 | Faries, Jr. et al. | |
| 6,384,380 B1 | 5/2002 | Faries, Jr. et al. | |
| 6,414,283 B1 | 7/2002 | McNamara | |
| 6,523,458 B1 | 2/2003 | Turner | |
| 6,525,298 B1 | 2/2003 | Hunts | |
| 6,612,116 B2 | 9/2003 | Fu et al. | |
| 6,617,552 B1 * | 9/2003 | Taylor | 219/400 |
| 6,660,974 B2 | 12/2003 | Faries, Jr. et al. | |
| 6,730,888 B1 * | 5/2004 | Battu | 219/502 |
| 6,774,343 B2 | 8/2004 | Ibanez | |
| 6,840,589 B2 | 1/2005 | Uri | |
| 6,849,835 B2 | 2/2005 | Bollmers et al. | |
| 6,914,221 B1 | 7/2005 | Witt et al. | |
| 6,928,752 B2 | 8/2005 | Johnson et al. | |
| 6,936,794 B2 | 8/2005 | Zhang et al. | |
| 6,982,399 B1 | 1/2006 | Hunts | |
| 7,235,109 B2 * | 6/2007 | Kleker | 8/149.3 |
| 7,235,762 B2 | 6/2007 | Gagas et al. | |
| 7,279,659 B2 | 10/2007 | Gagas et al. | |
| D574,115 S * | 7/2008 | Jeon et al. | D32/9 |
| 2004/0134087 A1 * | 7/2004 | Meyer | 34/90 |
| 2005/0211696 A1 * | 9/2005 | Adamski | 219/400 |
| 2007/0114221 A1 * | 5/2007 | Shon et al. | 219/401 |
| 2007/0158327 A1 * | 7/2007 | Morrow et al. | 219/385 |
| 2007/0158331 A1 * | 7/2007 | Morrow et al. | 219/412 |

OTHER PUBLICATIONS

"Wolf Warming Installation Instructions," Instruction Manual, Jan. 2004.

* cited by examiner

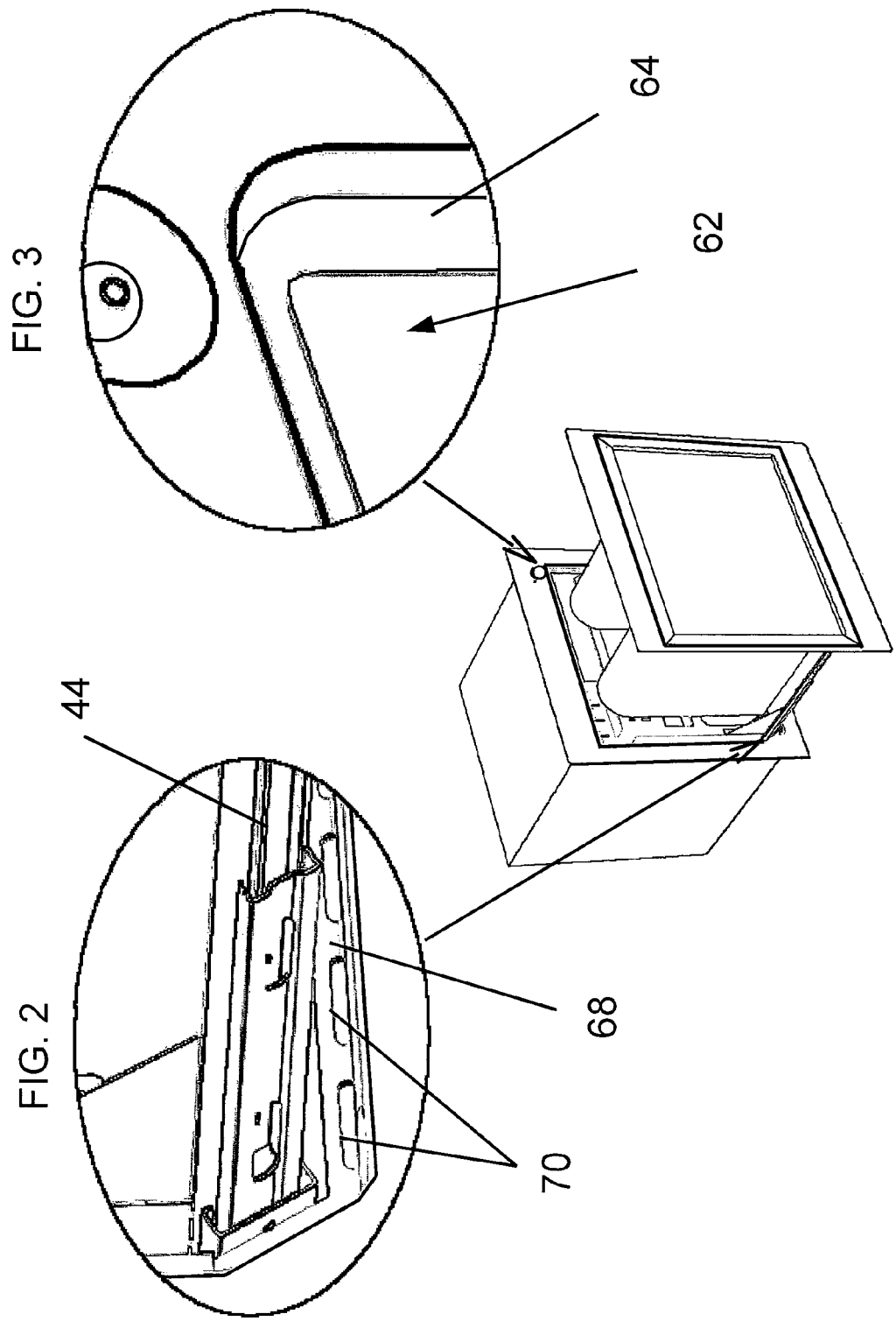

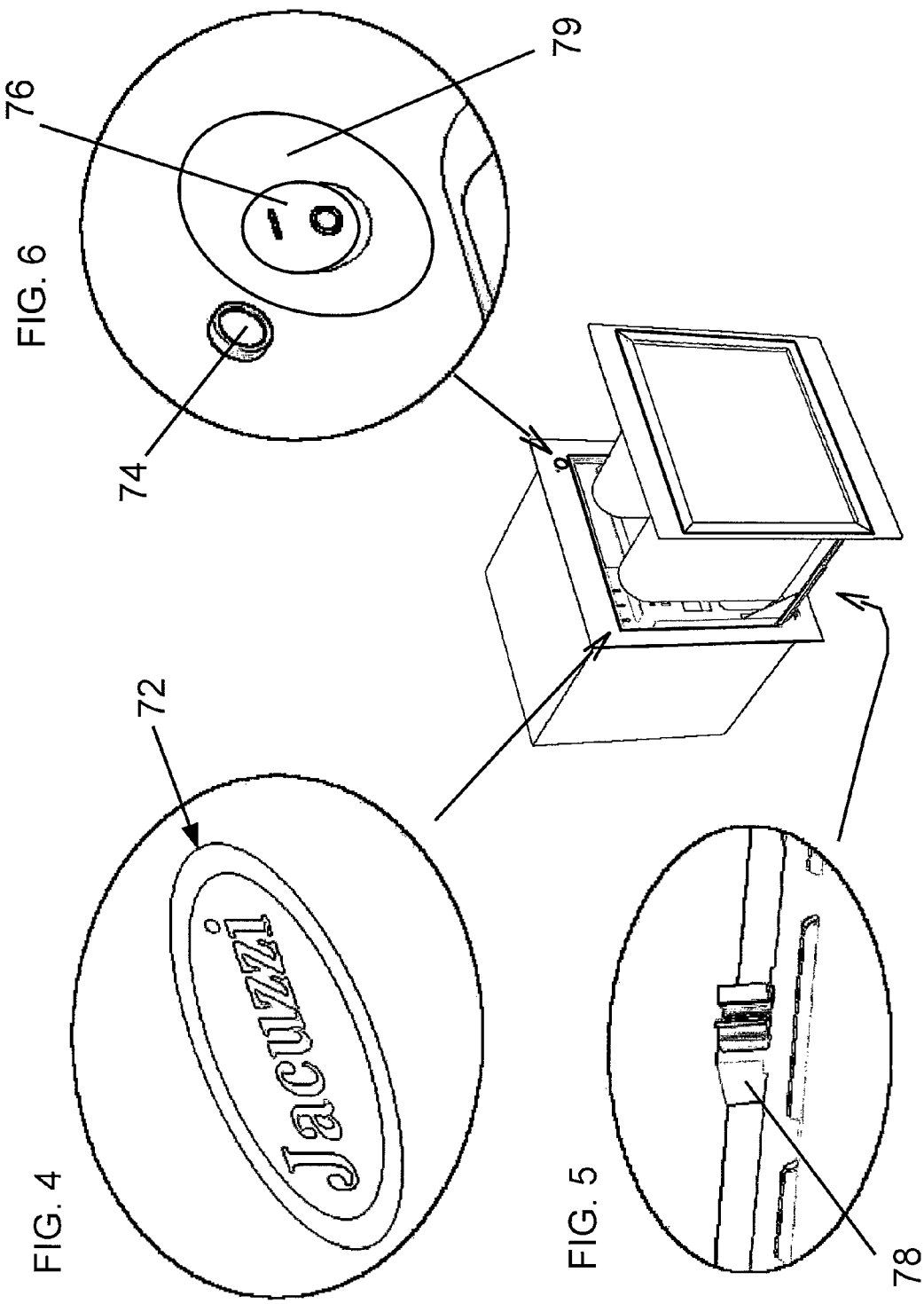

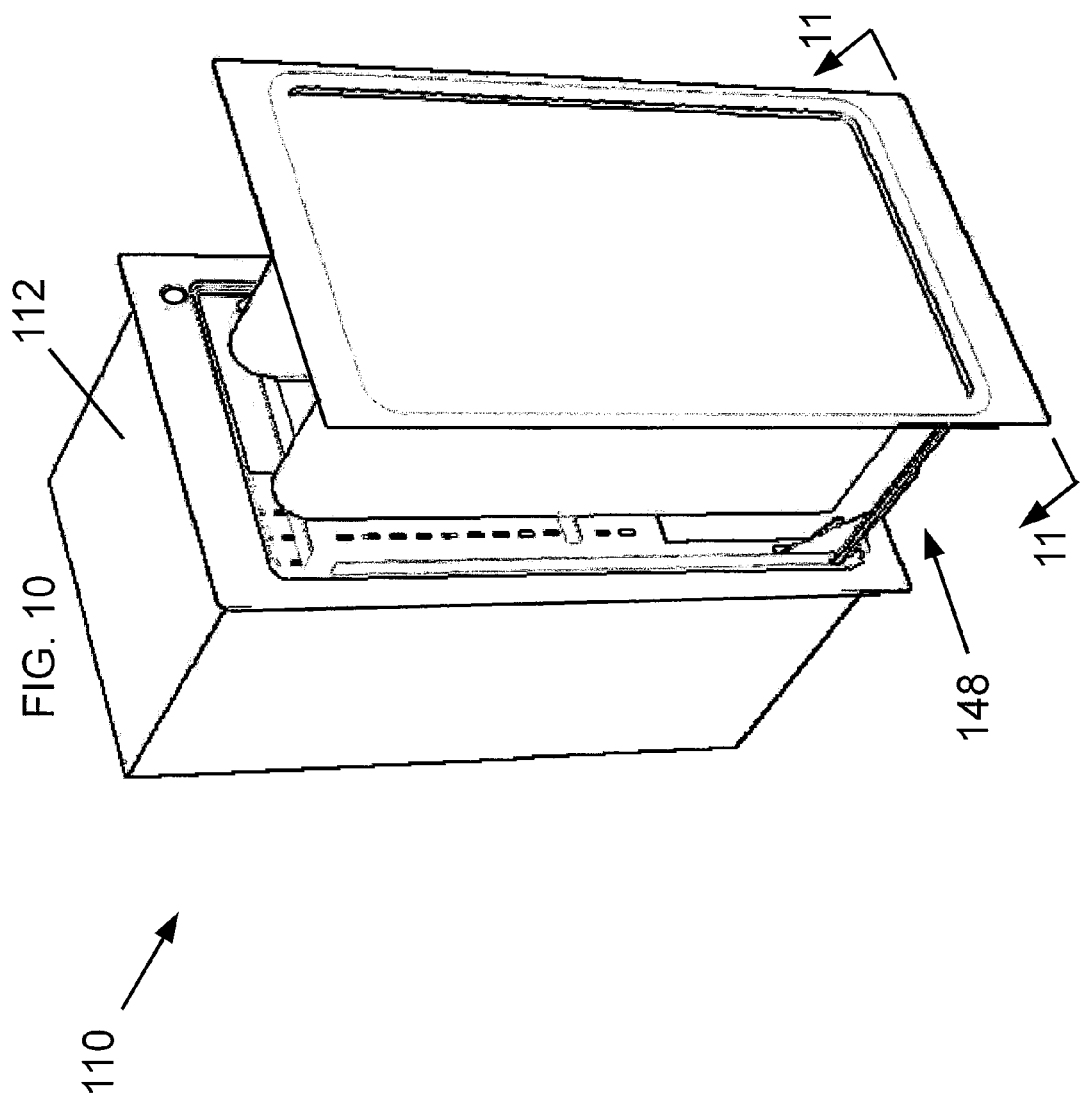

ELECTRONICALLY CONTROLLED WARMER DRAWER

CROSS REFERENCE TO RELATED APPLICATIONS

This application claims a benefit of priority under 35 U.S.C. §119 based on patent application Ser. No. 60/886,037, filed Jan. 22, 2007, the entire contents of which are hereby expressly incorporated by reference into the present application. This application also claims a benefit of priority under 35 U.S.C. §120 as a continuation-in-part of presently co-pending U.S. application Ser. No. 11/216,443, filed Aug. 31, 2005 now U.S. Pat. No. 7,488,919 and entitled "Warming Apparatus," the entire contents of which are hereby expressly incorporated by reference into the present application.

FIELD OF THE INVENTION

The present invention relates to warmer appliances and, more particularly to an electronically controlled warmer drawer.

BACKGROUND OF THE INVENTION

The below-referenced U.S. patents disclose embodiments that were at least, in part, satisfactory for the purposes for which they were intended. The disclosures of all the below-referenced prior United States patents in their entireties are hereby expressly incorporated by reference into the present application for purposes including, but not limited to, indicating the background of the present invention and illustrating the state of the art.

Examples of warming drawers previously patented by Western Industries, Inc. include U.S. Pat. Nos. 7,279,659 and 7,235,762, the entireties of all of which are incorporated herein by reference.

U.S. Pat. No. 6,982,399 relates to a towel warmer having an upper chamber and a lower chamber separated by a partition with a blower located in an upper portion of the housing. A sealable access means encloses the towel warming chamber while a temperature sensor provides an indication of the temperature within the warmer. The towel warmer has a substantially airtight trapezoidal enclosure and a first means consisting of a rhomboidal cavity inclined from front to back to hold the towel to be heated.

U.S. Pat. No. 6,840,589 discloses a towel warmer and dryer cabinet. The towel warmer and dryer cabinet has a front panel supported pivotably on an upper end of a towel rod support member and movable between a retracted position and an extended position. The towel warmer and dryer cabinet further has a securing means constructed to engage a support member for moving at least one towel rod accurately through the front side of the cabinet between retracted and extended positions.

U.S. Pat. No. 6,774,343 pertains to a towel and garment warmer. In the disclosed warmer, a garment or towel is supported by a plurality of rods extending through a portion of the enclosure of the warmer. A cover is pivotably connected to the housing to allow insertion and removal of the garment therefrom. The device for warming towels and other fabric items has a cabinet with an openable top lid.

U.S. Pat. No. 6,525,298 relates to a towel warmer. The towel warmer includes a housing having a pivotable door attached thereto and a cavity with a circulation plate positioned therein. The warmer further includes a hot air towel warmer having a first means disposed within a substantially airtight enclosure having air passages therethrough to support a towel.

U.S. Pat. No. 6,046,436 discloses a hot air towel warmer having a pivotable door constructed to allow passage of a towel into the warmer device. U.S. Pat. No. 6,005,227 discloses a towel warming console cabinet. An enclosure of the disclosed cabinet includes a plurality of supports constructed to receive materials thereon, a fan configured to circulate a heated air flow and a heat unit constructed to warm the circulated flow.

U.S. Pat. No. 5,842,287 relates to a towel warmer having a tubular rack constructed to support a garment to be warmed. U.S. Pat. No. 5,606,640 also discloses an apparatus for warming a towel. U.S. Pat. No. 5,569,403 discloses a towel warmer wherein the towel is removably mounted on a rack within a closed cabinet. Finally, U.S. Pat. No. 5,548,100 discloses an article warmer with heated frame and flexible enclosure.

As the above attempts are lacking in some respect, there exists a need for a state-of-the-art electronically controlled warmer drawer that overcomes these deficiencies.

SUMMARY OF THE INVENTION

One object of this invention is to provide a warming apparatus that has one or more of the characteristics discussed below.

The present inventive warmer apparatus for either indoor or outdoor use consists of an enclosure defining an upper chamber with a heating element operably connected to a lower chamber and a faceplate connected to the front of the enclosure. A sensor system, preferably comprising at least one sensor, is operably coupled to the chamber and sends signals to an electronic control system that is operably connected to the heating element and a user interface provided on the enclosure or faceplate. A drawer is provided and is extendable from the chamber of the warmer and a means for preventing fluids and other contaminants from entering the chamber is also provided for between the enclosure and the user interface and drawer.

The user interface, for example, an electronic control panel, can be installed raised, recessed, or flushed with the enclosure and can be constructed out of glass, plastic, metal, rubber or a composite material. The touch panel is preferably sealed and/or coated to protect the electronic controls from being damaged by the elements and to prevent fluids, insects, and other contaminants from gaining entry to the chamber through the touch panel. The touch panel may also include decorative overlays, labels, and trims that are configured for outdoor use. The touch panel may be mounted on the faceplate of the warmer or elsewhere on the enclosure and may be disconnected from the enclosure and used remotely by a wired or wireless controller. In another embodiment, the user interface uses one of a tactile, membrane, piezoelectric, capacitance, resistance, induction system, touch panel, or keypad for the selection of various operations.

The heating element may be included inside, outside, or remote from the upper chamber. When remotely located, the heating element can be configured to be in communication with the lower chamber by way of a duct. The warmer may comprise more than one heating element and the heating elements may be attached to or combined with a fan.

The warmer may be incorporated into another appliance such as, for example, a grill and may be either operated in combination with or independent from the appliance. The warmer may also be installed under cabinets or in a wall. Alternatively, the warmer may be used independent of any supporting structure so that it could be moved from place to place. The warmer could also be installed into a mobile island or a similar structure having a working surface and wheels foot pegs, or casters for moving the island from place to place. The warmer is preferably constructed to withstand high temperatures so that it may be installed in, underneath, or around heat-sensitive materials such as wood. Finally, the warmer may be configured to be stackable with like-devices or other appliances so as to conserve space.

The warmer preferably includes a fixed or variable speed fan that is located either in the chamber or remotely. Again, it may also be attached to the heating element or independent of it. The fan is used for mixing air, removing air, or controlling the moisture within the chamber of the warmer.

The warmer preferably includes a venting system that may consist of a plurality of apertures located on the back, bottom, ceiling, walls or front of the warmer. In another embodiment, the venting system includes at least one of an automatic, semi-automatic, or manually controlled aperture closures and a user interface to set, operate, and adjust the aperture closures.

The warmer can be used for non-food or food and drink items alike. Flavoring additives may be added to the chamber so as to impart various flavors or scents to the items being warmed within the warmer.

The warmer preferably includes a lighting element located inside the chamber that may be illuminated when the warmer is opened or when a switch is activated. The warmer also preferably includes a door made of transparent material to aid the user in seeing inside the chamber without having to open the warmer. The door may be connected to the enclosure or drawer by way of a hinge so that the door may be swung open. Alternatively, the warmer may be constructed so that the door could be lifted up or folded down.

Another embodiment of the present invention includes an enclosure. The enclosure consists of sides, a top, and a bottom that define a chamber. In this embodiment, a structure, e.g., a drawer or door, is coupled to the enclosure for movement between a retracted position to warm objects and an extended position. The extended position is at least partially external to the chamber and allows the user to gain access to objects being warmed in the chamber. The structure preferably has a support member for supporting the objects that are to be warmed. A heating system designed to warm the chamber is also provided. A ventilation system for moving and circulating ambient air through the chamber is also provided. Provided on the enclosure is a user interface designed to allow the user to control the temperature within the chamber. At least one seal is preferably provided to prevent liquids and other elements from entering the chamber. Finally, an electronic control system is provided. The electronic control system is coupled to the enclosure and interfaces with the heating and ventilation systems as well as the user interface.

The inventive warmer may also include a timer control that may be programmed by a user to automatically turn off the warmer after a certain amount of time. The warmer may also be capable of preset temperatures, preset times, and preset operations.

The warmer's user interface may be configured to display the current time, operations, temperatures, functions, remaining time, diagnostics, features, fan speeds, alarm controls and signals, messages, timed on/off, time delay or be remotely controlled by voice or sound commands from the user.

The warmer may also comprise accessible panels or walls on either its front, side, top, back, or bottom so that a user may gain access to the chamber of the warmer. Furthermore, the warmer may comprise additional warming chambers, e.g., one for food and one for non-food items.

The preferred embodiment of the present invention includes an enclosure having a stainless steel interior defining an upper and lower chamber and a heating system, sensor system, and ventilation system to supply heat and control moisture in the chamber. The heating system is comprised of an electric PTC-ceramic heater in fluid connection with vent holes between the upper and lower chambers. The sensor system is comprised of a thermal limit switch operably connected to the chambers and configured for detecting at least one of temperature, humidity, items in the chambers, resistance, and power used. The ventilation system is comprised of a blower fan and a plurality of external vent holes on the front of the enclosure configured for moving air through the chambers. A structure having a plurality of upside down "V"-shaped support members to support objects thereon and coupled to the enclosure is also provided. The structure, e.g., door, is coupled by two angled guide members, i.e., slides, for movement between a retracted and extended position. A positive friction lock closure is provided to ensure the door can be securely closed. Also provided is a user interface consisting of a rocker on/off switch and blue LED power indicator. This embodiment also includes an electronic control system preferably coupled with the heating system, ventilation system, sensor system and user interface to keep the chamber at a desired temperature. Finally, a seal is provided between the structure and the enclosure to prevent moisture from entering the chamber when the structure is in the retracted position.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

The drawings illustrate the best mode currently contemplated of practicing the present invention.

In the drawings:

FIG. 2 is a fragmentary enlarged view of a portion of the warmer drawer of FIG. 1;

FIG. 3 is fragmentary enlarged view of another portion of the warmer drawer of FIG. 1;

FIG. 4 is fragmentary enlarged view of another portion of the warmer drawer of FIG. 1;

FIG. 5 is fragmentary enlarged view of another portion of the warmer drawer of FIG. 1;

FIG. 6 is fragmentary enlarged view of another portion of the warmer drawer of FIG. 1;

FIG. 10 is a perspective view of a second embodiment of the warmer drawer of the present invention;

Figure 1:
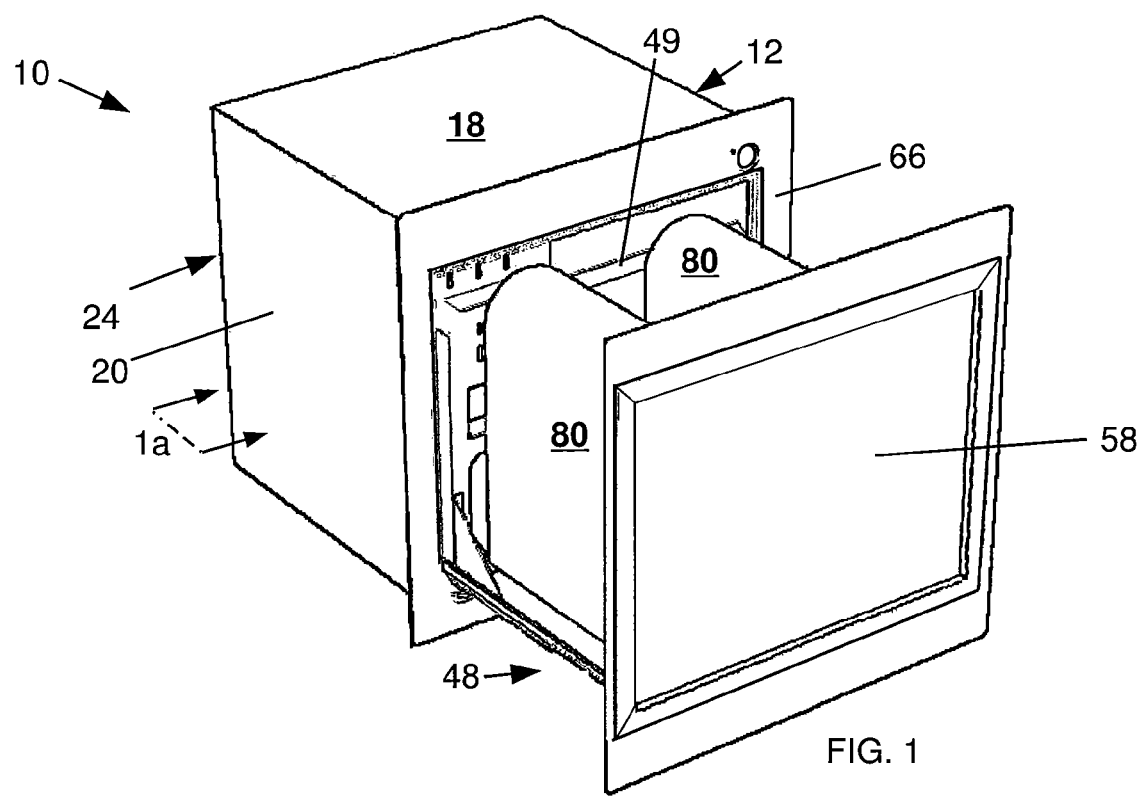
FIG. 1 is a perspective view of one embodiment of the warmer drawer of the present invention.

In describing the preferred embodiment of the invention that is illustrated in the drawings, specific terminology will be resorted to for the sake of clarity. However, it is not intended that the invention be limited to the specific terms so selected and it is to be understood that each specific term includes all technical equivalents that operate in a similar manner to accomplish a similar purpose. For example, the word "connected," "attached," "coupled," and "mounted" and variations thereof herein are used broadly and encompass direct and indirect connections, attachments, couplings, and mountings. In addition, the terms "connected," "coupled," etc. and variations thereof are not restricted to physical or mechanical connections, couplings, etc. Such "connection" is recognized as being equivalent by those skilled in the art.

Further, before any embodiments of the invention are explained in detail, it is to be understood that the invention is capable of other embodiments and of being practiced or of being carried out in various ways. Further, the use of "including," "comprising," "at least one of," or "having" and variations thereof herein are meant to encompass the items listed thereafter and equivalents thereof as well as additional items.

DESCRIPTION OF PREFERRED EMBODIMENTS

The present invention and the various features and advantageous details thereof are explained more fully with reference to the non-limiting embodiments described in detail in the following description.

1. SYSTEM OVERVIEW

The present invention is preferably an appliance or device, for example, including an electronically controlled warmer having an enclosure with sides, e.g., a top, bottom, front, back, left and right walls, a chamber, drawer, door, user interface, faceplate, at least one heating element, a venting system, fan, sensor or detection system, electronic control system, and environmental seals.

As described herein, the warmer or warming drawer preferably comprises a heating element such as a electric PTC (Positive Temperature Coefficient) ceramic heater. However, more than one heating element may be used. Alternatively, other heating elements may replace or be used in conjunction with the PTC ceramic heater in the warmer drawer. Other potential heating elements that may be used include: convection heaters, calrods, wire heating elements, heat plates, glass film, thermal ceramic heaters, flexible heaters, lights, infrared, inductive, electromagnetic, and radio frequency devices, heat pumps, warming liquids, heat exchangers, axial fan heaters, sonic heaters, and gas and solid fuel products. Electronically controlled heating methods such as radiant, infrared, conduction, inductive, convection, resistance and microwave methods may also be used.

It should be noted that the heating element described herein is preferably located within a second, i.e., upper, chamber that is adjacent to the warmer drawer chamber. However, the heating element could be located in various other places including inside the warmer drawer chamber, possibly on the side, back, bottom, or top walls of the chamber. Alternatively, the heating element could be mounted remote from the warming drawer but in communication with the drawer, for example, via a duct. Using this type of heating element alone or in combination will increase the heat control and accuracy of the inside temperature of the cavity, thereby achieving even temperatures throughout the chamber.

A user interface is provided on the warmer drawer for control by the user. As further described below, the interface may include an electronic touch panel designed to control the heating elements. Alternatively, knobs, slides, or switches may be used. The user interface can be, for example, piezoelectric, capacitance, tactile (membrane switches), resistance type, padless touch soft switch technology, padless touch digital encoder, infrared frequency dependent, magnetic switches, field effect, charge transfer, Hall Effect, micro encoder, infrared, high frequency, inductive computer key board, computer screen, sound, radio frequency, or induction touch panel (keypad) for use by the operator. Such controls can be installed on the warmer flush, recessed, or raised and coupled. Electronic controls can be placed on any surface so as to accommodate any design for matching other products.

In the embodiment shown, the controls are recessed within a faceplate located on the warming drawer enclosure to permit a door to be closed flush with the faceplate. Such a control, e.g., electronic touch panel, may be made of glass, metal or plastic with selection of the operating function(s) made by touching the surface of the glass, metal, plastic or of other substrates to operate the warming apparatus. The panel may also have membrane, tactile, resistance, and/or capacitance switches with decorative overlays, labels, and trim. Touch control keypad panels can be installed flush, raised, recessed, or remotely on any plane with the use of electronics. Remote control can be by wire or by wireless means so that the electronic controls may be placed on any surface to accommodate any design or for matching other products. Any of these types of user interfaces may be fitted with decorative overlays, labels, and trim so as to interface with the user.

The use of electronics is disclosed herein. For example, these include micro-controllers, microprocessors, integrated circuits and drivers, PC Boards, processors, and power circuits may be used to better control functions, operations, and temperatures and may be factory preset so as to limit the user to simple on and off operation of the unit. The overall size, design, look, and feel of the warmer can be matched to the size, design, look, and feel of any appliances associated with the warmer.

Electronic controls are generally sealed better than mechanical controls, and therefore electronic controls are less susceptible to degradation when exposed to the elements. Electronics also reduce the unit size so that the inventive warmer may now be used in a number of places where present units cannot.

The electronic controls described herein may be configured to allow for timed on/off control based on one or more sensors or controls such as temperature, moisture control, electronic sensors, programmable/selectable set point(s), programmable/selectable set time(s), programmable/selectable set operation(s), and programmable/selectable set temperature(s).

The user interface may also be controlled remotely, e.g., having the control device located not on the warmer but in a different location. Remote control can be by a wired or wireless device using a, for example, infrared signal for controlling the functions and operations of the warmer. Other forms of wireless communication such as Zigbee or RF may also be used. Remote control may include one-way or two-way communication. In one embodiment, the remote control is configured to support two-way communication between the user interface and a remote device so that the remote device receives signals from the warmer and displays information such as the current setting or temperature. The use of electronics provides for better control and offers more operations than can be had in a mechanically controlled device. The warmer may also be configured with factory preset operations, functions, and temperatures.

The warmer drawer preferably includes an electronic control system operably coupled with the user interface and the heating element. The electronic control system preferably will control the heating element in response to a signal from the user interface so that the operator may be able to maintain the appropriate temperature within the chamber.

The electronic control system described herein is designed to better regulate the electrical current supplied to the heating element. By improving the accuracy of the current supplied to the heating element, control of the heat output to the chamber is improved, and thus the accuracy of the temperature in the chamber is also improved. By improving the accuracy of the temperature within the chamber, the quality of, for example, food items in the warmer is also improved. PTC sensor technology is one method for controlling or regulating the current supplied to the heating element. PTC technology provides better control over the current supplied to the heating element and thus greatly reduces the need to continuously cycle power on and off to regulate temperature. As such, temperature over and undershoots are greatly reduced, and the time required to heat the chamber to the proper temperature is also reduced. PTC technology is but one method of controlling the current supplied to the heating element, and it should be noted that other methods are contemplated.

The electronic controls may also be coupled by a system that protects the electronic controls in the case of a malfunction. One example of such a system is the watchdog timer, which is a timer counting cycles of a separate on-chip 128 kHz oscillator. The watchdog gives a system reset when the counter reaches a given time-out value. In normal operation mode, it is required that the system uses the Watchdog Timer Restart ("WDR") instruction to restart the counter before the time-out value is reached. If the system doesn't restart the counter, a system reset will be issued. The system reset from the watchdog gives a reset when the timer expires and is used to prevent system hang-up in case of runaway code or other malfunction preventing program operation. The reset condition reinitializes the system hardware and software from the beginning. Inputs and outputs are default inputs (high-impedance) after reset, until configured by the same program that is periodically restarting the watchdog. This prevents outputs from driving off-chip circuitry under persistent conditions causing reset from the watchdog.

A fan is also disclosed herein. In general, the fan is for circulating heated air throughout the upper and lower chamber and controlling humidity build-up. The fan may be used with or without a heating element attached to it. It can be secured to the inside of the upper chamber or remotely located but in fluid communication with the warmer. The fan may preferably be used to circulate air to provide better heat control and response time. By circulating air, hot spots or stratified layers of varying temperature within the chamber are eliminated. Improvements to the cavity temperature help to eliminate the temperature swings inside the chamber, thus providing better control and eliminating the need for user control. The fan may be a fixed or variable speed fan.

A motorized, electromagnetic, solenoid, powered or non-powered venting system may also be provided. The venting system is preferably configured to optimally control the temperature, humidity, and airflow of the chamber. Sensors or a system of sensor may be utilized to determine the humidity or temperature in the chamber and to send a signal to the venting system's electronic control system reporting the sensed humidity or temperature. The venting system, in response to a signal from the electronic control system, may open or close the vents to regulate the conditions within the chamber. The venting system may further comprise mechanical louvers, slots, apertures, closures, or holes for controlling the moisture in the chamber. The venting may be located in the back, bottom, ceiling, walls, or front faceplate.

The sealing means may also include gaskets, adhesive tape, double sided tape, RTV, glues, epoxies, silicon gels, foam, rubber shapes, and other materials. Welding may also be used to seal the warmer. The device preferably has at least one weather-tight seal between the door and the frame preventing environmental contaminants from entering the chamber and/or damaging any of the electronics located within the device. Seals may be located anywhere else on the device where there may be gaps present that would allow fluids or other environmental contaminants from entering the chamber.

Additionally, sealing of the electronic components and user interface is accomplished with coatings, for example, that cover the electronics, electronic boards, and or other components.

One or more sensors for the warmer are also described. These may be used to sense various environmental conditions. In one embodiment, a sensor scans the warmer for an item placed therein. It may also provide feedback to the device's electronic control system to operate a fan. Sensors for the appliance may be also used to detect at least one of: airflow, smoke, temperature, speed, power, resistance, voltage, programmed operations, and set points. The use of sensors and sensor systems will allow for more control over the environment inside the chamber, thus regulating and maintaining proper temperature and humidity levels. Maintaining proper temperatures can prevent food objects placed in the warmer from drying out. Additionally, non-food items placed in the drawer, such as towels, can benefit from being stored at the proper temperature and humidity levels.

In one embodiment, a scanning infrared detection system could be placed in the upper chamber of the warmer to detect the temperature of the contents of the chamber. In one embodiment, thermopile (pyrometry) and thermopile infrared sensors are used. Various other sensors could be used, but are not limited to, those such as a thermostat, thermal disk, thermal protector, thermal cutoff, electronic temperature controller/sensors, electronic/mechanical AC or DC sensor/control devices, temperature sensors, thermal switch, thermal couples, bulb and capillary, electronic controls, bimetallic, pressure switches, creed action thermostats, resistance temperature detectors, controllers, manual resets, automatic resets, disc thermostat, snap action switch, negative temperature coefficient of resistance thermistors, and power positive temperature coefficient of resistance thermistors.

The warmer described herein preferably has a movable drawer assembly that can be constructed in a number of different ways. For example, the drawer can use guide members coupled to the chamber of the device for retracting and extending the drawer. The guide members are connected to a movable frame that facilitates the retraction and extension of the drawer. Alternatively, one could use slides, glides, formed grooves, rollers, ball bearings, bearing pads, or other methods of guiding the drawer into the chamber. In another embodiment, the drawer can be directly coupled to the guide members without the use of movable frame. In this embodiment, the drawer is simply placed in and out of the warmer by mounting the drawer assembly on opposed angle slides. The drawer may be operated with a control and powered drive or may be manually operated.

The enclosure described herein preferably comprises a frame, front, back and two side vertical panels, an upper panel and a bottom panel. The drawer assembly comprises a frame having a back panel, bottom panel, front faceplate panel and a plurality of towel bars mounted to the back panel and front faceplate.

The front faceplate panel can be constructed so as to match the surrounding appliances or cabinetry. The door front is preferably designed to channel any fluids or other environmental contaminants away from the device. In the preferred embodiment, a positive lock closure helps hold the drawer assembly to the enclosure.

The device is preferably made with high-heat construction so that it can safely be installed into or along side cabinets or walls constructed of wood or other materials susceptible to degradation when coming into contact with heat. The device can also be constructed so that it is a freestanding or standalone unit not requiring a structural frame or cabinet. Preferably, the device is constructed of a material resistant to chemicals, high and low temperatures, ultraviolet rays, fluids, and insects.

The device preferably consists of a warmer with a lighting element located inside the chamber to provide illumination. The lighting element is preferably configured to illuminate upon opening and/or upon the turning on of a switch. The lighting element can consist of any type of lighting device capable of withstanding the temperatures within the chamber. Because warmers are typically placed low to the ground, it is typically difficult to see the objects inside the chamber. The use of the lighting element will greatly increase the operator's ability to see inside the chamber. This may be aided through the use of glass or transparent doors on the front of the device.

The disclosed warmer may also be equipped with at least one of: a colored, e.g., blue, LED power indicator, on/off rocker switch, a LCD display, an illuminated display that can be adjusted in color and intensity, a plasma display, a dot matrix display, line segment display, and a vacuum fluorescent display may be used for displaying of information such as functions, temperature, humidity, and times.

Programmable set points, times, timers, temperatures, on/off settings, and operations are another aspect of the present invention. The electronic control system, through signals preferably received from the user interface, can operate and control the programmable settings. The use of an electronic control system offers an advantage over a mechanical system where the user would not be able to program such settings.

In one embodiment, the device may have a timed on/off control so that the device is automatically turned off after a predetermined period of time.

In another embodiment, the warmer is configured with factory-preset times, points, operations and temperatures. In this embodiment, the device simply comprises an on/off switch or control and no other user interaction is necessary to operate the warmer.

2. DETAILED DESCRIPTION OF THE PREFERRED EMBODIMENTS

Various embodiments of the device of present invention are shown in FIGS. 1-13, which are described in additional detail below. All of these embodiments are configured from the same basic design and like reference numerals refer to like components.

Referring to FIGS. 1-7, a non-food warming appliance 10 (hereinafter also referred to as a "warmer drawer 10") is comprised of an outer enclosure or housing 12 defining a cavity 14. The enclosure 12 can be made of stainless steel, plastic, coated metal, glass, ceramic or other metal or non-metal materials or combination of such materials and can be of a decorative nature. According to the illustrated embodiments, the chamber is not intended to be airtight, and is provided with suitable passageways (e.g. air inlet, air exhaust, etc.) to foster a desired air flow pattern within the chamber.

Figure 1A:
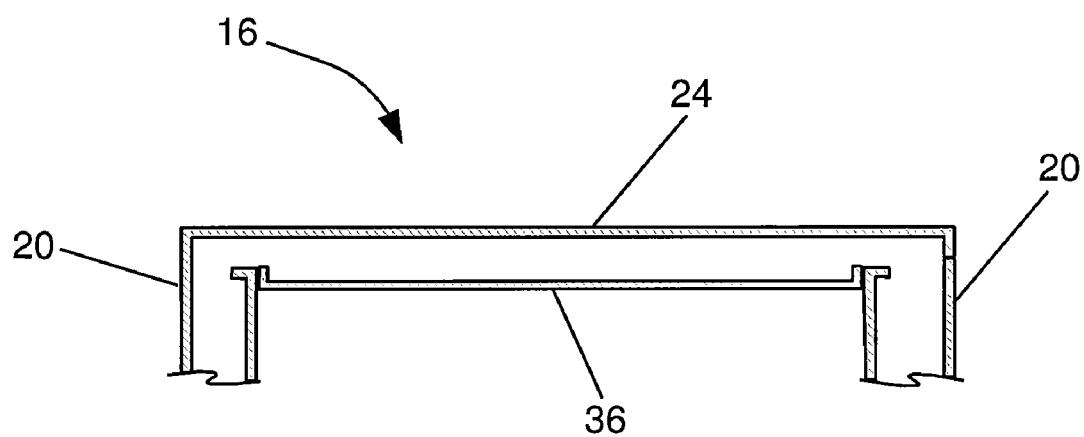
FIG. 1a is a section view of the warmer drawer taken along line 1a-1a of FIG. 1.
Figure 7:
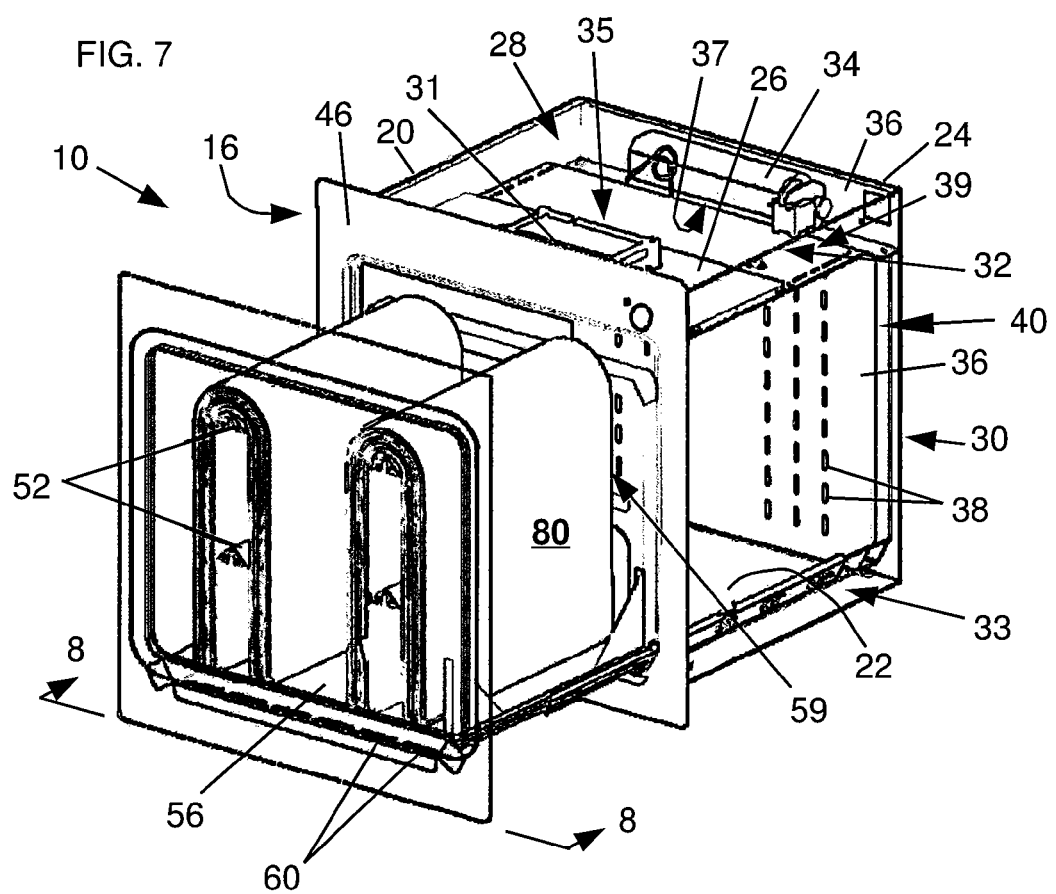
FIG. 7 is an exploded view of the warmer drawer of FIG. 1 with sections removed to show flow.
Figure 9:
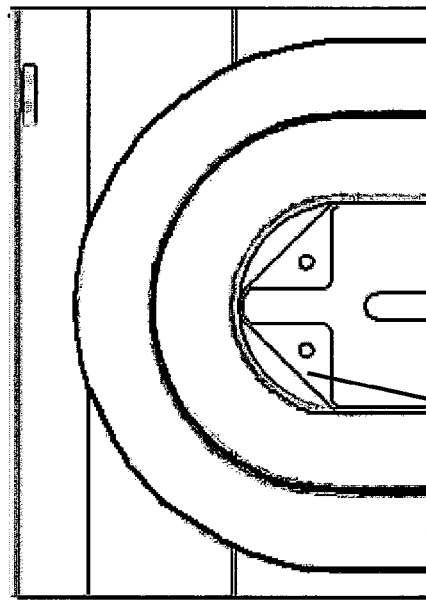
FIG. 9 is a fragmentary enlarged view of the area along 9-9.
Figure 8:
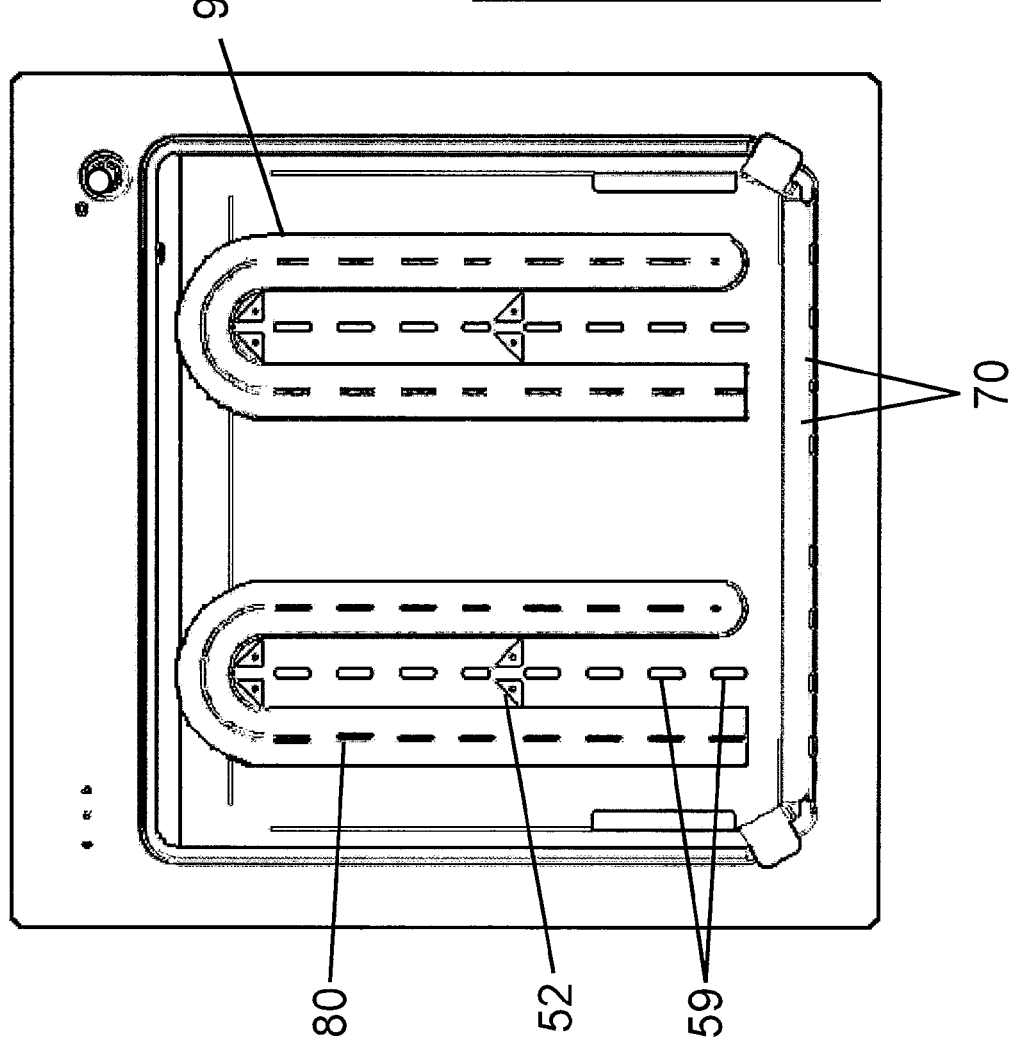
FIG. 8 is a sectional plan view taken along the lines of 8-8.

As best seen in FIGS. 1, 1a, and 7, the warmer drawer 10 includes frame 16, along with a top 18, sides 20, a bottom 22, and a back 24, all which comprise the outer enclosure 12. Single wall construction of the enclosure 12, preferably out of stainless steel, may be used in applications where the surrounding surfaces can accommodate the heat loss. As shown in FIGS. 1a and 7, a double wall construction with an insulating material or airspace between the walls to minimize heat loss to the external surface of the enclosure 12 may be used.

A partition 26 divides the cavity 14 into an upper chamber 28 and a lower chamber 30. The upper chamber 28 contains a heat source, e.g., PTC ceramic heater 31, a sensor, e.g., thermal limit switch 32, and an air handling unit or fan, e.g., cross-flow blower 34. The ceramic heater 31 is positioned above an air inlet 35. Air flowing into the upper chamber 28 through the inlet 35 passes through the heater 31 when entering the chamber 28. The fan 34 is connected to an upper chamber outlet vent 37 such that heated air flowing through the fan 34 is directed to the lower chamber 30. The fan 34 may alternatively be located in the lower chamber 30 or even remotely from the warming drawer 10 and may be either a fixed or variable speed fan. The fan 34 can be used for at least one of removing air, mixing air, and controlling moisture in the lower chamber 30. In another embodiment, the fan 34 is connected to and works in combination with the heating element 31. Heater 31, thermal limit switch 32 and fan 34 are operatively connected to electronic controls 39.

The lower chamber 30 includes a back plate 36 having a plurality of apertures 38 formed therein. The heated air directed by the fan 34 is blown into a space 40 formed between the back wall 24 of the enclosure 12 and the back plate 36. The air is then forced through the plurality of apertures, or slots, 38 by a difference in pressure to provide a uniformly diffused airflow. Angled support housings 42 for retractable slides 44 are also located in the lower chamber 30. The interior dimensions of the preferred embodiment are eighteen inches wide by seventeen and three-eighths inches high by fifteen and one-half inch deep (18" W×17⅜" H×15½" D).

The warming drawer 10 further comprises a front panel 46 and a drawer assembly 48. The drawer assembly 48 preferably includes a rack 49 having at least one support member, i.e., bracket, hanger or towel bar, 52 for supporting objects thereon. Each towel bar 52 is preferably formed from a sufficiently rigid material in an upside down "V" or triangular shape to "open up" or spread out the objects to be warmed, e.g., towels (see FIGS. 7-9). Furthermore the "V" shape towel bar may permit air to move freely around the objects to be warmed and the cavity, may decrease the time to warm the object, and may help to provide an even temperature distribution for the object to be warmed. Preferably, the towel bars are made of metal which may facilitate heating the portion of the item to be warmed, e.g., a towel, that is in contact with the towel bar. The drawer assembly 48 is preferably coupled to the enclosure 12 via movable fixtures such as slide assemblies 44 for movement between a retracted position to warm the objects in the lower chamber 30 and an extended position so that an operator may access the towel bars 52. The drawer assembly 48 further comprises a base plate 56 and a door or faceplate 58. Slots 59 are formed in the rack 49 and aligned in fluid connection with the slots 38 in the back plate 36. Outlet vents, e.g., slots, 60 are formed in the front of the base plate 56 near the face plate 58 to complete the air flow path thereby facilitating air flow over the towel bars 52.

The front panel 46 has an opening 62 formed therein to receive the drawer assembly 48. The front panel 46 preferably includes seals 64 between the drawer faceplate 58 and the enclosure 12. The seals 64 prevent fluids and other environmental contaminants from entering the lower chamber 30. The opening 62 is formed with an upper recessed lip portion 66 to receive the seals 64 and a lower recessed lip portion 68. A number of slots, or inlet vents, 70 are formed across the width of the lower lip portion 68 to draw in fresh air, though some heated air from vents 60 may also be drawn in.

The front panel 46 may further comprise an etched logo 72 and an indicator, i.e., blue LED, 74. An electronic control panel, e.g., on/off rocker switch 76, is provided within a small recessed portion 79 and operatively connected to the electronic controls 39. Alternatively, any number of electronic displays could be used, such as an electronic touch panel that can be configured to allow a user to select the desired heating parameters. The logo 72, indicator 74 and switch 76 are covered by the faceplate 58 and hidden from view when the drawer assembly 48 is closed.

As previously mentioned, the drawer assembly 48 comprises two slide assemblies 44 to move the drawer assembly 48 between a retracted and an extended position. A friction lock closure 78 is located on the lower lip portion 68 to latch with a corresponding closure (not shown) to hold the drawer assembly 48 closed.

In operation, the drawer assembly 48 is opened to reveal the support members, i.e., towel bars 52. Non-food objects, preferably textile fabrics including towels 80, are draped over the bars 52 and the warming drawer 10 is turned on via rocker switch 76. The drawer assembly 48 is then closed, i.e., returned to the lower chamber 30. The heater 31 is turned on and automatically begins heating the air in the warming drawer 10. The fan 34 turns on and begins to circulate warmed air from the upper chamber 28 to the lower chamber 30. Warmed air flows through the lower chamber 30 and circulates about the towels 80.

The majority of air is drawn in from the front of the warmer 10 under the moveable drawer assembly 48 through the inlet vents 70 located in the lower lip 68 of the enclosure front panel 46. The air is pulled into a space 33 created from the double wall construction of the warmer 10. A small slot (not shown) between the lower chamber 30 and the space 33 permits an additional, though limited, amount of heated air to flow into the space 33. The mixed air travels up the sides of the warmer 10 through the space 33. The air is pulled into the upper chamber 28, through the heater 31 and into the blower fan 34.

The heated air is then directed back into the lower chamber 30 via the space 40 and through the slots 38 in the back plate 36 and finally into the drawer assembly 48 via slots 59. Due to the opening and spreading of the towels 80 from the towel bars 52, a greater surface area of the towels 80 is exposed and heated by the heated air. After passing through and around the towels 80, the majority of the heated air is vented through the vents 60 in the base plate 56. Some of the heated air is vented through the slot (not shown) and into the space 33 as previously discussed. After a period of time has passed, the door 58 is opened and the drawer assembly 48 is pulled out from the lower chamber 30 via the slide assemblies 44 with warmed towels 80.

Figure 11:
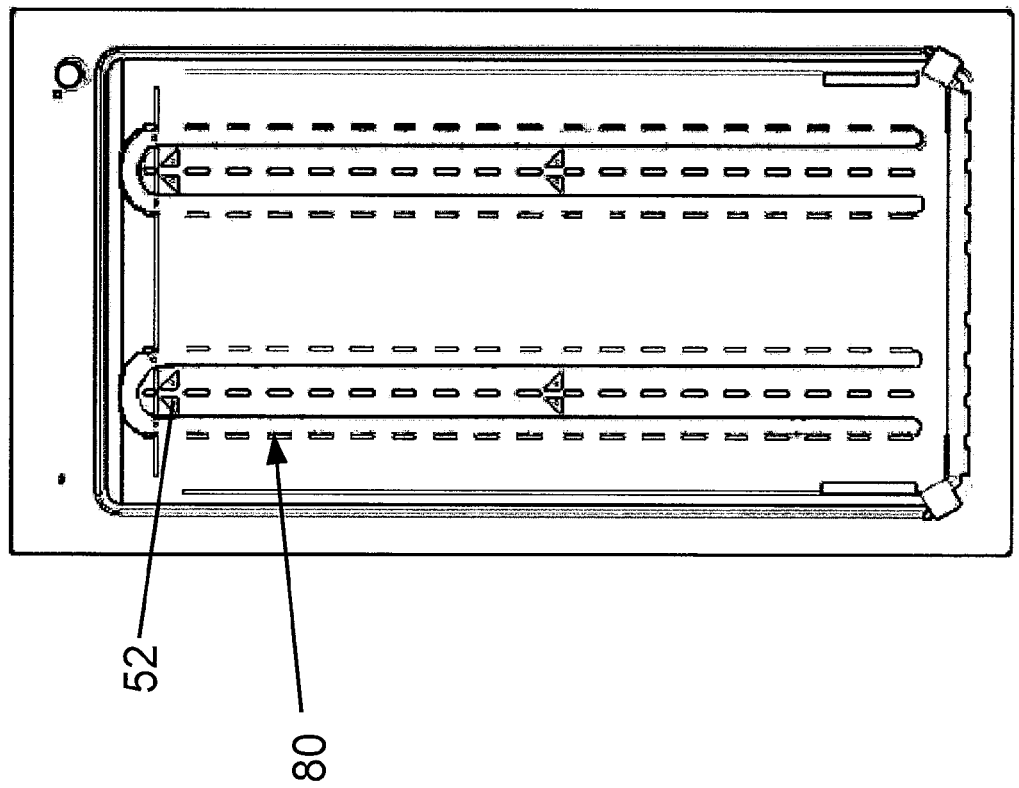
FIG. 11 is a sectional plan view taken along the lines of 10-10.

Referring now to FIGS. 10-11, a slightly different embodiment of the present invention is shown. As seen in FIG. 10, the warming drawer 110 also includes an enclosure 112 and a drawer assembly 148. The preferred interior dimensions of this embodiment are eighteen inches wide, thirty-five and three-eighths inches high by fifteen and one-half inches deep (18" W×35⅜" H×15½"D).

Figure 12:
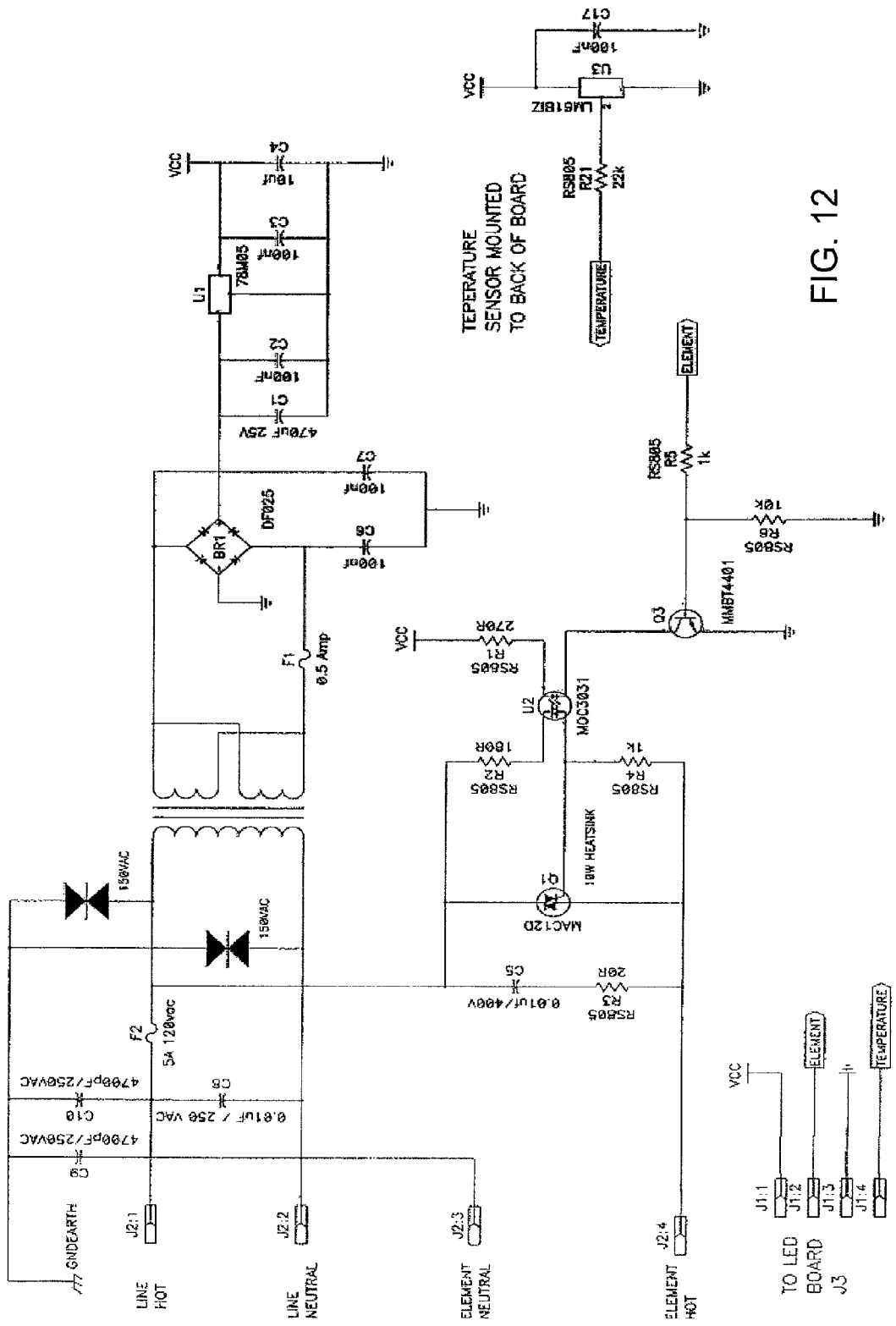
FIG. 12 is a schematic of an electronic control circuit for use with the present invention.
Figure 13:
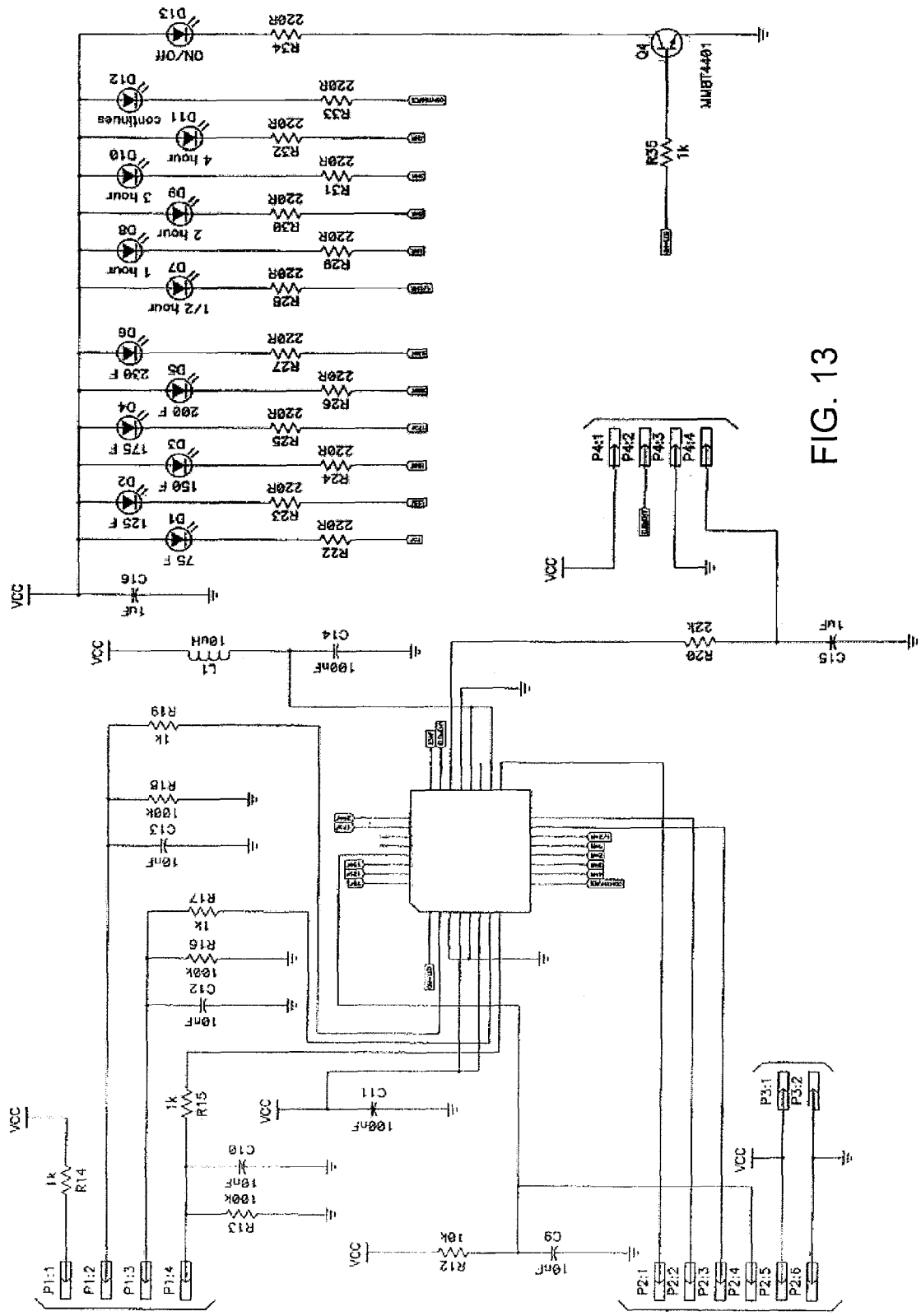
FIG. 13 is a schematic of another electronic control circuit for use with the present invention.

FIGS. 12-13 show examples of control circuits that may be used with the current invention. These are only examples of preferred control circuits, and the control circuit of the present invention is not limited to those disclosed in FIGS. 12 and 13.

The warming drawer 10 may be installed at any suitable location, e.g., a cabinet or a support platform. It is preferred that the warming drawer 10 be secured at the desired location to prevent the warming drawer 10 from tilting or even falling over when the door is opened. For example, an anti-tip brace could be installed to prevent the warming drawer 10 from tipping forward when it is opened and loaded.

For installation into a cabinet, the following method may be used. First, an installer may position the warming drawer 10 in front of the space into which the warming drawer 10 is to be inserted. Second, the installer may plug the power cord into the desired outlet, ensuring that any excess cord length is positioned so that the warming drawer 10 will not pinch, kink, score or cut the cord when the warming drawer 10 is inserted into the opening. Third, the installer may slide the warming drawer 10 into the space until the face plate of the warming drawer 10 is flush to the surface of the cabinet. At this time, the installer may check the warming drawer 10 to ensure that it is level within the space. Finally, fasteners, e.g., screws, may be used to secure the warming drawer 10 within the cabinet. A wood plank or decorative plate may be used to cover the drawer front. This allows the drawer to better fit into the surrounding environment.

After the warming drawer 10 has been installed, it may be operated as follows. First, the operator may open the drawer of the warming drawer 10. Second, the operator may place the desired items, e.g., towels, into the warming drawer 10. Third, the operator may push the on/off switch to turn on the warming drawer 10, which will then begin to heat the desired items, e.g., towels. After the desired items have been warmed, the operator may then open the drawer and remove the desired items, e.g., towels, from the warming drawer 10. The operator may then press the on/off switch to turn off the warming drawer 10.

Although the best mode contemplated by the inventors of carrying out the present invention is disclosed above, practice of the present invention is not limited thereto. It will be manifest that various additions, modifications, and rearrangements of the features of the present invention may be made without deviating from the spirit and scope of the underlying inventive concept. In addition, the individual components need not be fabricated from the disclosed materials, but could be fabricated from virtually any suitable materials. Moreover, the individual components need not be formed in the disclosed shapes, or assembled in the disclosed configuration, but could be provided in virtually any shape, and assembled in virtually any configuration. Further, although various components as described herein as physically separate modules, it will be manifest that they may be integrated into the apparatus with which they are associated. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

We hereby claim:

1. A warmer drawer comprising:
a frame having a top, a bottom, a first and a second side, a back, and a front panel and defining a cavity having at least two chambers wherein at least one side includes an inner wall, an outer wall, and a space between the inner wall and the outer wall, defining a double-wall side;
a drawer assembly slidably connected to the frame, wherein the drawer assembly is sized to fit within at least one of the chambers through an opening in the front panel, wherein the drawer assembly includes:
a base plate generally defining the lower surface of the drawer;
at least one inlet vent disposed on the front panel below the drawer assembly in fluid communication with a first chamber of the at least two chambers via the space in the double-wall side; and
at least one exhaust vent disposed in a portion of the base plate extending outside of the front panel in fluid communication with a second chamber of the at least two chambers;
a door connected to the drawer assembly;
a heating element located in at least one of the chambers;
a fan for moving heated air within the cavity;
controls for operating the fan and the heating element; and
a sensor in communication with the electronic controls for controlling the current supplied to the heating element.

2. A warmer drawer according to claim 1, wherein the first chamber is an upper chamber of the cavity and the second chamber is a lower chamber of the cavity.

3. A warmer drawer according to claim 2, wherein the fan is located within the upper chamber and moves air from the upper chamber to the lower chamber.

4. A warmer drawer according to claim 1, wherein the sensor is a positive temperature coefficient sensor.

5. A warmer drawer according to claim 1, further comprising a second heating element located within the cavity.

6. A warmer drawer according to claim 1, further comprising a seal between the door and the front panel.

7. A warmer drawer according to claim 1, wherein the controls are electronic and include at least one of the following programmable settings: set points, timers, temperatures, on/off settings.

8. A warmer drawer according to claim 1, further comprising at least one towel bar attached to the drawer assembly.

9. A warmer drawer according to claim 8, wherein the at least one towel bar has a cross section that is generally V-shaped.

10. The warmer drawer of claim 1 further comprising
a partition within the cavity that divides the cavity into an upper chamber and a lower chamber, wherein the first chamber is the upper chamber and the second chamber is the lower chamber,
a positive temperature coefficient heating element located in the upper chamber, and
wherein the fan draws air from outside the warmer drawer through the at least one inlet vent and passes the air to the upper chamber.

11. A warmer drawer according to claim 10, further comprising a back plate having a plurality of apertures, wherein the back plate is positioned within the cavity so as to form a space between the back wall and the back plate, and wherein the fan forces the air into the space, through the apertures, and into the lower chamber.

12. A warmer drawer according to claim 10, further comprising two slide assemblies to move the drawer assembly between a retracted position and an extended position.

13. A warmer drawer according to claim 12, further comprising a friction lock closure to secure the drawer assembly within the cavity when the drawer assembly is in the retracted position.

14. A warmer drawer according to claim 10, further comprising a towel bar mounted to the drawer assembly and configured to support a draping towel, and wherein the towel bar has a cross section that is generally V-shaped.

15. A warmer drawer according to claim 10, further comprising an electronic control panel attached to the housing.

16. The warmer drawer of claim 1
wherein the heating element is
an electrical heater located in at least one of the chambers to heat the air, and further comprising
a back plate having a plurality of apertures, wherein the back plate is positioned within the cavity so as to form a space between the back wall and the back plate, and wherein the blower forces the air into the cavity through the second-mentioned space and through the apertures.

17. A warmer drawer according to claim 16, further comprising a second electrical heater.

18. A warmer drawer according to claim 16, further comprising a door selectively moved between an open and a closed position by one of a hinge and a pair of slides connected to the housing.

19. A warmer drawer according to claim 16, wherein the electronic controls are coupled with a timer system that resets the electronic controls to a default setting in the case of a malfunction of the electronic controls.

* * * * *